(No Model.)
J. LUCKSINGER.
WAGON AXLE.
No. 343,772. Patented June 15, 1886.
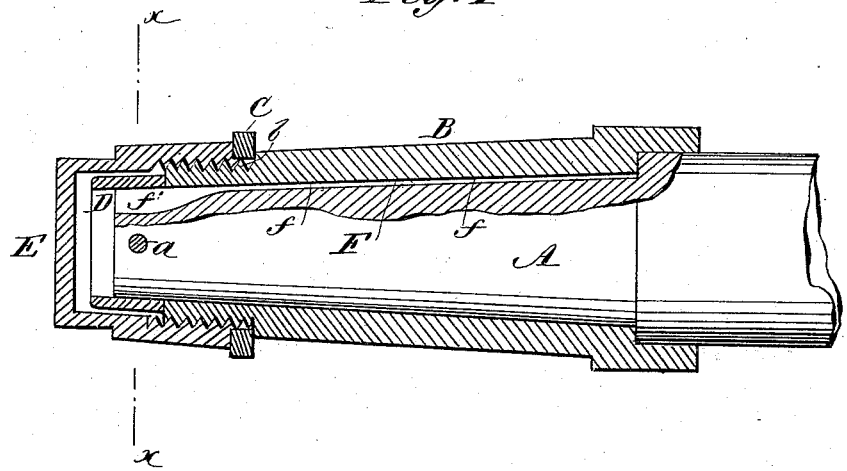
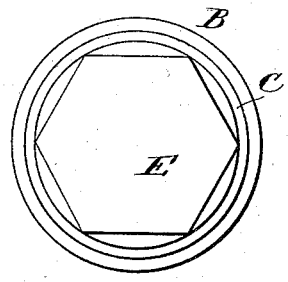 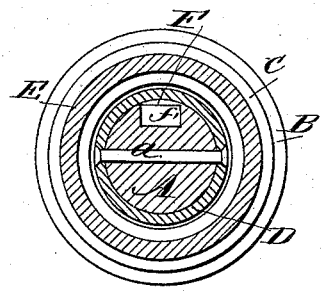
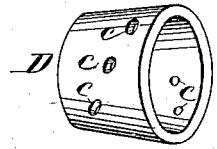
WITNESSES:
C. Neveux
C. Sedgwick
INVENTOR:
J. Lucksinger
BY Munn & Co
ATTORNEYS.

United States Patent Office.

JOHN LUCKSINGER, OF BEAUFORT, MISSOURI.

WAGON-AXLE.

SPECIFICATION forming part of Letters Patent No. 343,772, dated June 15, 1886.

Application filed November 18, 1885. Serial No. 183,207. (No model.)

*To all whom it may concern:*

Be it known that I, JOHN LUCKSINGER, of Beaufort, Franklin county, Missouri, have invented a new and Improved Wagon Axle and Skein, of which the following is a full, clear, and exact description.

The object of my invention is to devise a practical wagon-axle, skeins, and cap-nut, so constructed that the axle may be oiled without removing the wheel from the axle.

Another object is to provide a simple and practical device for taking up the wear of the skein, so that the wheel may always be made to run true upon the axle and prevent chocking.

Reference is to be had to the accompanying drawings, forming part of this specification, in which similar letters of reference indicate corresponding parts in all the figures.

Figure 1 is a sectional elevation of a wagon-axle, skein, nut-point, washer, and skein-adjusting ferrule, all constructed and arranged in accordance with my invention. Fig. 2 is a front elevation of the same. Fig. 3 is a sectional elevation taken on the line *x x*, Fig. 1, and Fig. 4 is a perspective view of the skein-adjusting ferrule removed from the axle.

The invention will first be described in connection with the drawings, and then pointed out in the claims.

A represents the axle; B, the skein; C, the point-washer of the skein; D, the ferrule for taking up the wear of the skein B; and E represents the point-nut of the axle. The axle A has the oil-groove F formed in it, and this groove is shallow, as shown at *f*, for nearly the whole length of the axle, but is of considerable depth at the point of the axle, as shown at *f'*. The skein B is held upon the axle A, not by the nut E, but by the ferrule D, which is held upon the point of the axle by a pin, *a*, passed through corresponding holes in the ferrule and axle, so the necessity of screw-threading the point of the axle is avoided; and there are several holes, *c c*, made through the ferrule D, at different distances from its edges, so that by removing the pin *a* and turning the ferrule on the point of the axle and placing the pin in different holes the ferrule may be adjusted to take up any endwise wear of the skein B. The point of the skein B is screw-threaded, as shown at *b*, to receive the screw-threaded portion of the nut E, and the nut E screws against the washer C, to fasten the hub of the wheel upon the skein. The nut E is a cap-nut, and in oiling the axle this nut E is simply to be removed from the point of the skein B and filled with oil and replaced. The screwing on of the nut will force the oil into and along the groove F and thoroughly oil the axle, and a supply of oil will remain in the cap-nut E, which will gradually find its way into and along the oil-groove F and keep the axle in a perfect state of lubrication. The large opening *f'* of the oil-groove F at the front of the axle facilitates the entrance of the oil from the nut E to the oil-groove, so that the thorough oiling of the axle may always be relied upon.

Having thus described my invention, I claim as new and desire to secure by Letters Patent—

1. The axle A, having the oil-groove F formed in it, made shallow at *f* and of considerable depth at the point of the axle, substantially as and for the purposes set forth.

2. The skein B, screw-threaded at *b* and held upon the axle by the ferrule D, in combination with the cap-nut E, screwed upon the point of the skein, substantially as shown and described.

3. The axle A and skein B, in combination with the ferrule D, formed with a series of holes, *c*, arranged at different distances from the edges of the ferrule, to receive pin *a*, for adjusting the ferrule and taking up the endwise wear of the skein, substantially as described.

JOHN LUCKSINGER.

Witnesses:
 LOUIS LUCKSINGER,
 KASPER SOLLICKER.